UNITED STATES PATENT OFFICE.

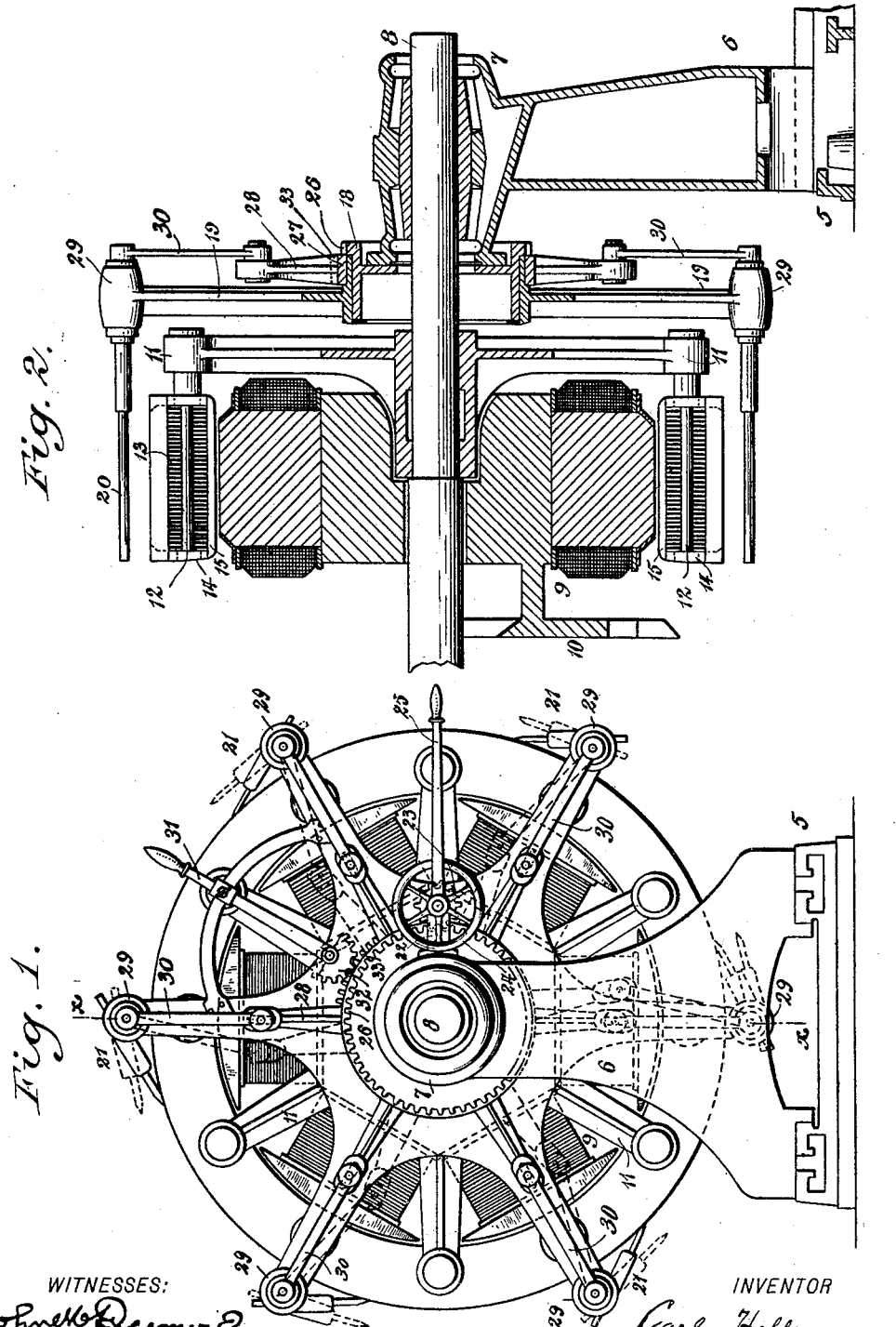

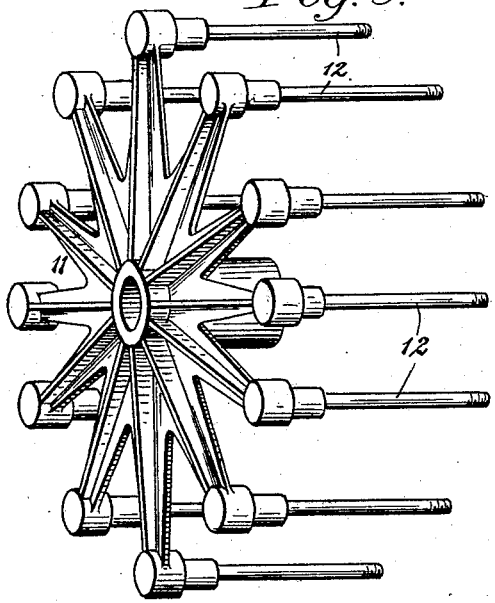
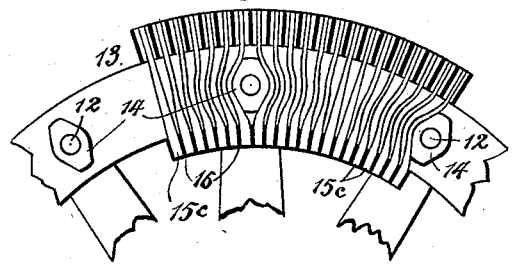
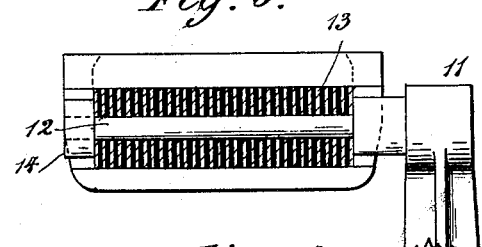
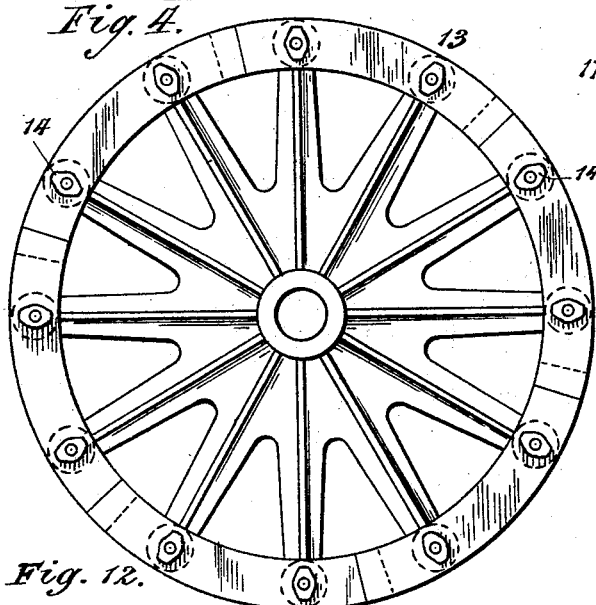
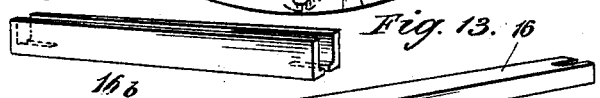
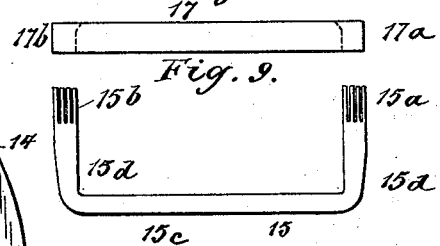
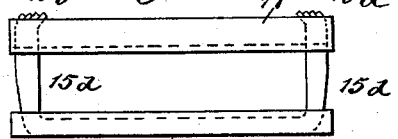
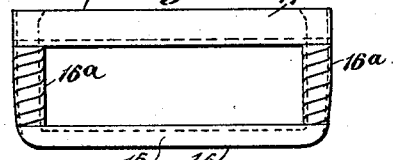
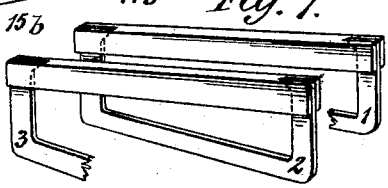

CARL HOFFMANN, OF BERLIN, GERMANY, ASSIGNOR TO SIEMENS & HALSKE, OF SAME PLACE.

DYNAMO-ELECTRIC MACHINE.

SPECIFICATION forming part of Letters Patent No. 509,662, dated November 28, 1893.

Application filed February 28, 1893. Serial No. 463,994. (No model.)

*To all whom it may concern:*

Be it known that I, CARL HOFFMANN, a subject of the King of Prussia, German Emperor, residing at the city of Berlin, in the German Empire, have invented new and useful Improvements in Dynamo-Electric Machines, of which the following is a specification.

My invention refers more particularly to the construction of the armature of a dynamo-electric machine, and consists, generally, in forming the armature of a laminated magnetic core and locating upon it bars of copper, so shaped and connected as to form a closed ring or endless spiral around said core.

My invention further relates to the various details of construction as regards the armature, brush-holding and shifting devices, &c., which will hereinafter be more specifically set forth and described.

The object of my invention is to construct an armature which shall have an extremely low internal resistance, and which will serve both as an armature and commutator from which the currents generated by the machine may be directly collected.

A further object of my invention is to provide such an arrangement of the contact brushes as that they may be readily shifted over the entire surface of the armature, thereby allowing the maximum delicacy and accuracy of regulation of the efficiency of the machine.

Referring to the accompanying drawings which illustrate my invention, similar figures of reference indicate like parts.

Figure 1 is a front elevation; Fig. 2, a vertical section on the line X X of Fig. 1. Fig. 3 is a perspective view of the spider upon which the segmental core plates are mounted. Fig. 4 is a front view showing the segmental core plates in position. Fig. 5 is a side view showing the relation of the core plates and the armature segments to each other, when in position. Fig. 6 is an elevation of one section of the armature spiral, and a transverse section of the segmental core plates, showing the core plates mounted upon one of the transverse arms of the spider. Fig. 7 is a perspective which is intended to give a general idea of the way the armature sections or coils are connected; and Figs. 8, 9, 10, 11, 12 and 13 indicate the several parts which go to make up the armature sections.

In a former patent for an improvement in dynamo-electric machines, granted to F. von Hefner-Alteneck and myself, No. 395,019, dated December 25, 1888, there was described a dynamo-electric machine constructed substantially the same as that set forth in the present application, with the exception that the machine set forth in the patent was provided with a separate commutator. In the present machine, the outer or external periphery of the armature segments forms the commutator, and by this means, I am enabled to do away with the various losses, through resistance, &c., and also to obviate the trouble always found to exist in machines where the commutator is of a comparatively small size relative to that of the armature.

Referring to the drawings, 5 indicates the base of the machine, upon which is mounted an adjustable stand 6, having formed in its upper end, a bearing 7, for the armature shaft 8.

9 represents the field magnets of the machine, which are connected to and suitably supported by means of the plate 10, which forms a part of their bodies.

11 is a brass or bronze spider, suitably secured upon the shaft 8, so as to rotate with it. The spider 11 is provided with a series of horizontal arms 12, over which are placed thin segmental plates 13 of sheet iron. The plates in Fig. 4 are shown to overlap each other: they are perforated at points corresponding to the arms 12, so as to allow the plates to be slipped over the arms.

It is my practice in constructing an armature, as fast as a circle of plates has been placed upon the spider, to lay over the plates a sheet of thin paper, after which another row of plates is put on, and this is repeated until the spider is full, after which securing nuts 14 are applied over the ends of the arms 12, which serve to retain the plates firmly in position. After the core is thus formed, I proceed to construct the armature as follows:

Referring first to Fig. 9, there is shown a copper bar 15, the ends of which are turned upward at right angles, and slit or cut as shown at $15^a$ and $15^b$. Copper bars of this character, so made, are placed around the core 13, to occupy the positions shown in Fig. 2. Before placing the copper bars 15 in position, their lower sides 15ᶜ are covered with a casing of paper 16, (Fig. 13,) and the sides 15ᵈ covered with insulating tape 16ᵃ. When two similar bars 15 have been brought into position, a top bar 17 (Fig. 8), the ends of which are slotted at 17ᵃ and 17ᵇ, over which is placed the paper insulating covering 16ᵇ (Fig. 12), is set down over the opposite ends of two succeeding bars, as shown in Fig. 7. That is to say, the end 17ᵃ of the bar 17, takes over the end 15ᵃ of the first bar, and the end 17ᵇ, over the end 15ᵇ of the second bar, and they are secured in position by turning over the ends 15ᵃ and 15ᵇ, as shown in Fig. 10. Fig. 11 illustrates one segment of the armature formed and finished. This arrangement is continued all around the core until there is formed a closed ring or endless spiral, after the manner of the "Gramme-ring," the convolutions of the armature coil being insulated from each other by means of the paper casings 16, 16ᵃ and 16ᵇ.

In Fig. 5, it will be observed that the bars 15 are bent where they come in contact with the nuts 14, which hold the segments of the core together.

In constructing the bars 15, I prefer to make them slightly wider at the bottom 15ᵉ, as shown in Fig. 5. By this means, I obtain a better separation between succeeding bars on the surface of the armature. After the succeeding bars have been connected together, and their ends 15ᵃ 15ᵇ upset, the armature is put into a lathe, and the ends 15ᵃ 15ᵇ, which project above the surface, as well as the mass of insulating paper which projects above the surfaces of the bars upon its periphery, cut down so as to make the surface of the armature perfectly smooth and even. The respective bars, as before stated, are insulated from each other by the portions of paper 16ᵇ, which are located between them.

Instead of using paper as an insulating material, various other materials may be used, although I have found a good quality of insulating paper to answer all the requirements.

Referring to Fig. 2, 18 represents a sleeve fixedly attached to the bearing 7. Mounted upon this sleeve, so as to rotate around it, is the star 19, carrying the horizontal arms 20. Mounted upon the arms 20 are the collecting brushes 21, which bear upon equidistant points around the commutator.

22 represents a post secured to the bearing 7, projecting laterally and forming a pivotal point for the pinion 23, hand wheel 24 and lever 25. The pinion 23 takes into a rack 26, formed upon the sleeve of the star 19; thus, by rotating the hand wheel 24, or changing the position of the lever 25, in a circumferential direction, all of the brushes 21, mounted on the arms 20, can have their positions upon the commutator surface of the armature simultaneously altered, either forward or backward, as desired, and may be moved to such an extent as that the entire periphery of the armature will be traversed thereby, thus allowing the maximum regulation of the efficiency of the machine.

At times, it is desirable to simultaneously and quickly move all of the brushes out of contact with the commutator armature of the machine, and this I accomplish as follows:

Mounted upon the sleeve of the star 19 is a sleeve 27, carrying the radial arms 28. The arms 20 of the star 19 are revoluble in bearings 29 in the radial arms of the star. Connected to the ends of the arms 20, are links 30, pivoted in the arms 28.

31 is a lever having a pinion 32 in the rack 33 of the sleeve 27. Thus, by rotating the lever 31, the links will be thrown out of line into the dotted position shown in Fig. 1, which will cause the brushes to be lifted off of the commutator armature and assume the dotted positions shown.

In my improved machine, it will be observed that I provide for rotating the brushes, and removing them out of contact with the commutator armature, also for varying their positions upon the armature.

In a machine constructed substantially as set forth, very many advantages are obtained which are not necessary for me to specifically describe, but which will be evident to those skilled in the art to which this invention belongs.

I wish it understood that I do not limit myself in any wise to the particular construction of armature segments described, or the manner in which the straight and rectangular bars are united with each other, as many changes may be made therein without departing from the intent of my invention.

Having thus described my invention, I claim—

1. An armature for a dynamo electric machine comprising a core, a series of U-shaped bars covering the interior and adjacent sides thereof, the extremities of said bars being of less transverse diameter than the bodies thereof, and a series of straight bars insulated from each other, electrically and mechanically connecting at their ends successive continuous bars, in a manner to form a regular and insulated spiral around said core.

2. An armature for a dynamo electric machine comprising a core, a series of U-shaped bars covering the interior and adjacent sides thereof, the extremities of said bars being of less transverse diameter than the bodies thereof, and a series of straight laterally arranged bars insulated from each other, electrically and mechanically connecting at their ends successive continuous bars in such a manner as to form a regular and insulated spiral around said core.

3. A dynamo electric machine, consisting of an internal field, an external armature, and means for making peripheral contact with said armature.

4. A dynamo electric machine consisting of field magnets an armature revoluble in the field thereof, and collectors adjustable over the entire periphery of said armature.

5. A dynamo electric machine consisting of an internal field, an external armature, and collectors adjustable over the entire periphery of said armature.

6. A dynamo electric machine consisting of an internal fixed field, an external rotative armature, and collectors adjustable over the entire periphery of said armature, as set forth.

7. A dynamo electric machine consisting of an internal field, an external rotative armature comprising a core, a series of continuous bar sections insulated from each other, and having their outer periphery bare and forming commutator bars, the said bar sections arranged transversely and so as to include said core, and connected together in such a manner as to form an endless spiral there around, and collector brushes adjustable over the entire periphery of said armature, as set forth.

8. A dynamo electric machine consisting of an internal field, an external rotative armature comprising a core made up of laminated plates, a series of rectangular continuous bars placed over and covering the interior and adjacent sides of said core, a series of straight commutator bars insulated from each other, electrically and mechanically connecting successive rectangular bars in such a manner as to form an endless insulated spiral around the core; and collector brushes adjustable over the entire periphery of the armature.

9. In a dynamo electric machine, the combination of a core made up of laminated plates separated from each other by means of strips of paper, a series of rectangular insulated bars placed transversely over and covering the interior and adjacent sides of said core, a series of straight commutator bars insulated from each other and electrically and mechanically connecting the successive rectangular bars in such a manner as to form a continuous and closed circuit around said core, and brushes bearing upon said commutator bars at equidistant points around the armature and adjustable over the entire periphery thereof.

10. A dynamo electric machine consisting of an internal field, an external armature comprising a star provided with radial and horizontal arms, segmental perforated plates located on and secured to said arms to form a core, a series of continuous rectangular bars placed over and covering the interior and adjacent sides of said core, a series of commutator bars electrically and mechanically connecting successive rectangular bars in such a manner as to form an endless spiral around said core, insulating material so located as to insulate the respective bars from each other, and collector brushes making contact with said commutator bars and adjustable over the entire periphery of the armature.

11. In a dynamo electric machine, the combination of an internal field, an external rotative armature, brushes making peripheral contact with said armature, and means for independently raising said brushes from contact with the armature and for shifting them over the entire circumference thereof.

12. In a dynamo electric machine, the combination with the armature having a shaft arranged to revolve in a sleeved bearing, of a sleeved star revolubly mounted on said bearing and having horizontal arms arranged parallel with the face of the armature and provided with brushes arranged to bear upon the outer periphery thereof, and a pinion having operating means, journaled on said frame and in such position as to mesh with a fixed rack arranged concentric with said frame, whereby said frame may be given a rotary movement, and a consequent and corresponding shifting of the brushes may result.

13. In a dynamo electric machine, and in combination with the armature thereof, a sleeved bearing, a sleeved star mounted upon said bearing provided with horizontal arms arranged parallel to the face of the armature, and adapted to rotate in the arms of the star, a second sleeved star mounted upon the sleeve of the first star and having a rack arranged concentric therewith, links connected to the horizontal arms and to the radial arms of the second star, brushes located upon said arms and bearing upon the outer periphery of said armature, and a pinion having operating means journaled on said first star to mesh with said rack, whereby the said second star may be given a rotary movement and the brushes raised from contact with the armature.

14. A pair of elements for the herein-described armature winding, consisting of a U shaped bar having transversely serrated ends, and a straight bar having its ends slotted to receive and retain the said serrated ends as set forth.

15. The method of connecting a pair of elements of the herein-described armature winding, which consists in inserting the upwardly extending serrated ends of the U shaped bar into the slotted ends of the respective straight bars, subsequently upsetting the said serrated ends and finally dressing them flush.

16. A pair of elements for the herein-described armature winding consisting of a U shaped bar having upwardly turned laterally serrated ends and a straight bar having slotted and counter slotted extremities for the reception and retention of the said serrated ends of the U-shaped bar, as set forth.

In testimony whereof I affix my signature in the presence of two witnesses.

CARL HOFFMANN.

Witnesses:
GUSTAV STENZEL,
MAX WAGNER.